(12) United States Patent
Vangala et al.

(10) Patent No.: US 12,405,988 B2
(45) Date of Patent: Sep. 2, 2025

(54) COMPUTING SYSTEM FOR PROVIDING A PERSONALIZED USER EXPERIENCE VIA GRAPH INTELLIGENCE

(71) Applicant: Microsoft Technology Licensing, LLC, Redmond, WA (US)

(72) Inventors: Vipindeep Vangala, Hyderabad (IN); Prateek Gupta, Noida (IN); Niranjana R, Chennai (IN); Sangita Narayan Pitre, Hyderabad (IN); Dinesh Kumar, Jaipur (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/564,464

(22) PCT Filed: May 2, 2022

(86) PCT No.: PCT/US2022/027183
§ 371 (c)(1),
(2) Date: Nov. 27, 2023

(87) PCT Pub. No.: WO2022/250863
PCT Pub. Date: Dec. 1, 2022

(65) Prior Publication Data
US 2024/0248924 A1    Jul. 25, 2024

(30) Foreign Application Priority Data
May 27, 2021   (IN) .............................. 202141023720

(51) Int. Cl.
G06F 16/30     (2019.01)
G06F 16/358    (2025.01)
G06F 16/383    (2019.01)

(52) U.S. Cl.
CPC .......... *G06F 16/358* (2019.01); *G06F 16/383* (2019.01)

(58) Field of Classification Search
None
See application file for complete search history.

(56) References Cited

U.S. PATENT DOCUMENTS 10,740,704 B2    8/2020    Vangala et al.
2015/0248222 A1*  9/2015   Stickler .................. G06Q 10/06
                                                           715/763

(Continued)

FOREIGN PATENT DOCUMENTS

| WO | 2016144986 A1 | 9/2016 |
|----|---------------|--------|
| WO | 2020005623 A1 | 1/2020 |
| WO | 2022250863 A1 | 12/2022 |

OTHER PUBLICATIONS

"International Search Report and Written Opinion for PCT Patent Application No. PCT/US2022/027183", Mailed Date: Jul. 25, 2022, 13 pages.

(Continued)

*Primary Examiner* — Belix M Ortiz Ditren
(74) *Attorney, Agent, or Firm* — CALFEE, HALTER & GRISWOLD LLP

(57) ABSTRACT

A computing system identifies a heterogenous multi-entity graph user graph for a user based upon an identifier for the user. The user graph includes nodes and edges connecting the nodes. The nodes include topic nodes representing topics and entity nodes. The entity nodes represent people associated with the user, documents of the user, or derived information that is derived from the documents. The computing system identifies a cluster of the topic nodes corresponding to a productivity area of the user and performs a walk of the user graph based upon the subset of the topic nodes to identify a subset of the people, the documents, and (Continued)

the derived information. The computing system causes a graphical user interface (GUI) to be presented on a display, where the GUI includes identifiers for the subset of the people, the documents, and the derived information.

20 Claims, 7 Drawing Sheets

(56) References Cited

U.S. PATENT DOCUMENTS

2016/0294761 A1* 10/2016 Hameed ................. H04L 67/02
2020/0004565 A1* 1/2020 Kulkarni ............ G06F 3/04845

OTHER PUBLICATIONS

"Microsoft Viva", Retrieved from: https://www.microsoft.com/en-us/microsoft-viva, May 2, 2021, 16 Pages.

* cited by examiner

FIG. 3

TOP-OF-MIND 340

PRODUCTIVITY AREA 1 — 302 — 306

TAGS
Tag 1
Tag 2
Tag 3 — 308

ACRONYMS AND DEFINITIONS
Acronym 1 – Definition 1 — 310

COMMITMENTS
Commitment 1 — 312

PEOPLE
Person 1
Person 2
Person 3 — 314

MEETINGS
Meeting 1 — 316

EMAILS Show More
Email 1
Email 2 — 318

DOCUMENTS Show More
Document 1
Document 2 — 320

CUSTOMIZE 336

PRODUCTIVITY AREA 2 — 304 — 322

TAGS
Tag 4
Tag 5
Tag 6 — 324

COMMITMENTS
Commitment 2
Commitment 3
Commitment 4 — 326

PEOPLE
Person 1
Person 4 — 328

MEETINGS
Meeting 2
Meeting 3 — 330

EMAILS Show More
Email 3
Email 4 — 332

DOCUMENTS Show More
Document 3
Document 4
Document 5 — 334

CUSTOMIZE 338

DISPLAY 140

300

COMPUTING SYSTEM FOR PROVIDING A PERSONALIZED USER EXPERIENCE VIA GRAPH INTELLIGENCE

BACKGROUND

Conventionally, different computer-executable applications access and present different types of data to users. In an example, an email application accesses and presents emails to a user, a real-time messaging application accesses and presents real-time messages to the user, and a calendar application accesses and presents information pertaining to meetings to the user. In another example, a file explorer application provided by an operating system is utilized to locate a document of interest to the user and another application accesses and presents the document to the user.

Locating data that is pertinent to a user often involves switching between different applications. In an example, a contact of the user with whom the user is communicating references a document in a real-time message presented to the user via a real-time messaging application. The user decides that he/she would like to locate the document. As such, an email application receives input from the user in order to search for an email referring to the document. A file explorer application then receives further input from the user in order to locate the document in computer-readable storage. This approach to locating data is burdensome on computing resources as multiple applications are employed to locate the document. Furthermore, this approach is frustrating from a user experience perspective, as the user must manually set forth extensive input to locate the document.

SUMMARY

The following is a brief summary of subject matter that is described in greater detail herein. This summary is not intended to be limiting as to the scope of the claims.

A computing system that provides a personalized user experience via graph intelligence is described herein. The computing system identifies people, documents, and/or derived information from the documents that are pertinent to a productivity area of the user based upon a cluster of nodes in a user graph for the user. The computing system causes identifiers for the people, the documents, and/or the derived information to be presented in a graphical user interface (GUI) shown on a display.

In operation, the computing system obtains an identifier for a user. The computing system identifies a user graph for the user based upon the identifier for the user, where the user graph has been generated based upon user activity of the user in a plurality of applications. The user graph includes nodes and edges connecting the nodes. The nodes include topic nodes representing topics of the user and entity nodes, where each entity node represents a person associated with the user (e.g., a person with whom the person has communicated with electronically), a document associated (e.g., accessed by, authored by, etc.) with the user, or derived information that has been derived from one or more documents.

The computing system identifies one or more clusters of topic nodes within the user graph using a suitable graph clustering algorithm, where each of the one or more clusters corresponds to a different productivity area of the user. The computing system utilizes the topic nodes within the one or more clusters as seed nodes to perform a walk of the user graph, where performing the walk of the user graph identifies people, documents, and/or derived information represented by entity nodes, and where the people, the documents, and/or the derived information correspond to the productivity area. The computing system may rank each of the people, documents, and/or derived information based upon suitable criteria.

For each productivity area identified, the computing system causes identifiers for the people, the documents, and/or the derived information corresponding to the productivity area to be presented within a GUI of a canvas application (e.g., an email application, a real-time messaging application, etc.), where orderings of the identifiers for the people, the documents, and/or the derived information may be based upon respective rankings thereof. When the GUI receives a selection of an identifier in the identifiers from the user, the canvas application may perform a suitable action. In an example, the GUI receives a selection of an identifier for a document that is pertinent to the productivity area and the canvas application causes the document to be opened and presented on the display to the user. In this manner, the computing system is able to present different information pertaining to different productivity areas of the user in a single hub that can be readily accessed by the user.

The above-described technologies present various advantages over conventional approaches to locating and presenting pertinent data to a user. Vis-à-vis clustering of topic nodes in the user graph, the computing system described above is able to present information that is pertinent to the user without requiring the use of multiple application to search for such information. Furthermore, the computing system described above reduces manual input received from the user and provides an improved user experience.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 3 illustrates an example graphical user interface (GUI) that provides a personalized user experience via graph intelligence.

Figure 1:
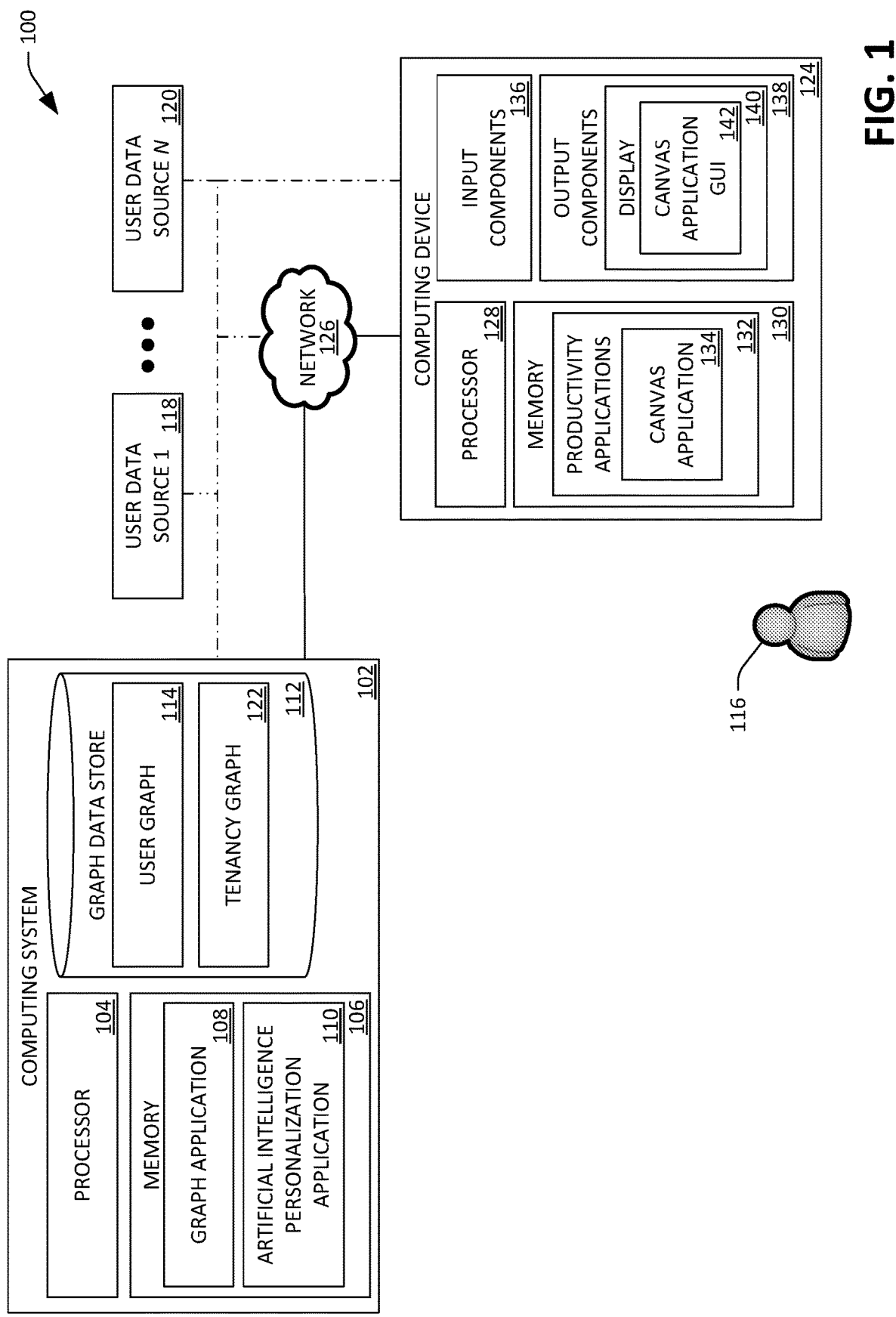
FIG. 1 is a functional block diagram of an example computing environment that provides a personalized user experience via graph intelligence.

Various technologies pertaining to providing a personalized user experience via graph intelligence are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

DETAILED DESCRIPTION

As noted above, locating data that is pertinent to a user conventionally involves multiple searches using multiple different applications. In an example, a user and a contact of the user are communicating electronically via a real-time messaging application and the contact of the user references a document that is relevant to a project that the user and the contact are collaborating on, but the contact does not know the exact name of the document. An email application receives input from the user, where the input includes details of the document provided by the contact of the user. The email application performs a search of emails of the user based upon the input. The search includes an email that has a title that includes the name of the document, but the document itself is not attached to the email. A file explorer application then receives the exact name as input from the user in order to locate the document in a user data source (e.g., local storage, cloud storage, etc.) of the user. An application corresponding to the type of the document then opens the application and displays the document to the user. The aforementioned approach to locating pertinent data is computationally burdensome and frustrating from a user experience perspective. A computing system is described herein that provides a personalized user experience via graph intelligence. The computing system provides the personalized user experience by clustering topic nodes within a user graph for a user. Each cluster of topic nodes corresponds to a different productivity area of the user. The computing system performs a walk of the user graph based upon each topic node in a cluster in order to identify people relevant to a productivity area, documents relevant to the productivity area, and/or derived information derived from the documents that is relevant to the productivity area. The computing system causes identifiers for the people, the documents, and the derived information to be presented on a display.

With more particularity, briefly, the computing system obtains an identifier for a user. The computing system identifies a user graph for the user based upon the identifier for the user, where the user graph has been generated based upon user activity of the user in a plurality of applications. The user graph includes nodes and edges connecting the nodes. The nodes include topic nodes representing topics and entity nodes, where each entity node represents a person associated with the user (e.g., a person with whom the user has communicated with electronically, a contact of the user as identified in an email application or real-time messaging application, a member of a team of the user, etc.), a document associated (e.g., accessed by, authored by, etc.) with the user, or derived information that has been derived from one or more documents.

The computing system identifies one or more clusters of topic nodes within the user graph using a suitable graph clustering algorithm, where each of the one or more clusters corresponds to a different productivity area of the user. The computing system utilizes the topic nodes within a cluster of topic nodes as seed nodes to perform a walk of the user graph, where performing the walk of the user graph identifies people, documents, and/or derived information that are pertinent to a productivity area. The computing system may rank each of the people, documents, and/or derived information in each productivity area based upon suitable criteria. The computing system may also rank each productivity area based upon the people, the documents, and/or the derived information.

For each productivity area, the computing system causes identifiers for the people, the documents, and/or the derived information to be presented within a GUI of a canvas application (e.g., an email application, a real-time messaging application, etc.). The identifiers for the people, the documents, and/or the derived information may be presented within the GUI based upon respective rankings thereof. When the GUI receives a selection of an identifier in the identifiers, the canvas application may perform a suitable action. In an example, the GUI receives a selection of an identifier for a person displayed within the GUI, and the canvas application causes an email message to be generated, where the email message is addressed to the person and where the email message includes an identifier for the productivity area in a subject line of the email. In this manner, the computing system is able to present different information pertaining to different productivity areas of the user in a single hub that can be readily accessed by the user.

The above-described technologies present various advantages over conventional approaches to locating and presenting pertinent data to a user. Vis-à-vis clustering of topic nodes in the user graph, the computing system described above is able to present information that is pertinent to the user without requiring the use of multiple application to search for such information. With more particularity, the computing system generates an improved GUI that presents different information pertaining to different productivity areas of the user in a single hub that can be readily accessed by the user. Furthermore, the computing system described above reduces manual input received from the user and provides an improved user experience. With more specificity, the GUI includes identifiers for people, documents, and/or derived information that are relevant to a particular productivity area. As such, the technologies described herein obviate the need for the user to manually search for people, documents, and/or derived information within different types of applications. In an example where the user needs to locate important emails for a project, the computing system described herein automatically identifies such emails (via the user graph) and presents identifiers for the emails to the user, without requiring the user to open an email application and manually search for the emails within the email application. When the user wishes to view one of the important emails, the user may select an identifier for the email display within the GUI, which causes an email application to be opened which presents the email to the user. Additionally, via ranking of the people, the documents, and/or the derived information in a productivity area and presenting identifiers for the people/documents/derived information that are ranked above a threshold within the GUI, the technologies described herein efficiently utilize limited screen space of a display and ensure that the user is not overwhelmed with information. With reference to FIG. 1, an example computing environment 100 that facilitates providing a personalized user experience via graph intelligence is illustrated. The computing environment 100 includes a computing system 102. In some embodiments, the computing system 102 may be or include a cloud-based computing service. The computing system 102 includes a processor 104 and memory

106. The memory 106 has a graph application 108 and an artificial intelligence (AI) personalization application 110 loaded therein. As will be described in greater detail below, the graph application 108, when executed by the processor 104, is configured to obtain (e.g., receive or generate) user activity data for users from a plurality of applications and to generate and maintain user graphs for the users based upon the user activity data. The user activity data may include historical activity data and/or real-time data collected via a plugin or interop communication. In some embodiments, the graph application 108 is also configured to generate tenancy graphs. The AI personalization application 110, when executed by the processor 104, is configured to provide a personalized user experience via graph intelligence (described in greater detail below).

The computing system 102 further includes a graph data store 112. The graph data store 112 stores a user graph 114 for a user 116. Although not depicted in FIG. 1, it is to be understood that the graph data store 112 stores a plurality of user graphs for a plurality of users, where each of the user graphs in the graph data store 112 may be indexed by an identifier for a corresponding user. The user graph 114 includes nodes and edges connecting the nodes. The nodes include topic nodes and entity nodes. The topic nodes represent topics that are relevant to the user 116. The entity nodes represent people (e.g., other users) associated with the user 116 (e.g., people nodes), documents of the user 116 (e.g., document nodes), or derived information of the user 116 that is derived from the documents (e.g., derived nodes). The entity nodes may also represent tenancies (e.g., a group, a team, or an organization) of the user 116. Thus, the user graph 114 for the user 116 is a heterogenous multi-entity graph. The graph application 108 generates the topic nodes by applying a variety of AI models and algorithms (e.g., classification models and algorithms) to documents represented by the entity nodes. Each edge in the user graph 114 is assigned criteria that is indicative of a relationship between entities represented by nodes that are connected by a respective edge.

The people associated with the user 116 are people with whom the user 116 has communicated with electronically or that are working in one or more productivity areas of the user 116 (to be explained below). The people associated with the user 116 may be contacts of the user 116. In an example, the user 116 communicates with the people associated with the user 116 via an email application (e.g., Microsoft® Outlook®) or a real-time messaging application (e.g., Microsoft Teams®). The real-time messaging application enables the user 116 to communicate over a network connection with other people in real-time using text-based communication, audio-based communication, video-based communication, or a combination thereof. In an example, the people associated with the user 116 work together on projects within a productivity area.

The documents of the user 116 are computer-readable content that is associated with (e.g., created by, edited by, accessed by, able to be accessed by, and/or viewed by) the user 116. Documents of the user 116 may include text documents, spreadsheets, slideshows, emails, and real-time messages. According to embodiments, the text documents are Microsoft® Word documents, the spreadsheets are Microsoft® Excel spreadsheets, the slideshows are Microsoft® PowerPoint® slideshows, the emails are authored, received, and viewed in Microsoft® Outlook®, and the real-time messages are authored, received, and viewed in Microsoft Teams®. According to embodiments, the documents of the user 116 include transcriptions of real-time audio/visual meetings conducted over a network connection via a meeting application (e.g., Microsoft Teams®). The documents of the user 116 may also include information associated with a calendar/scheduling application (e.g., Microsoft® Outlook®). In an example, the information associated with the calendar/scheduling application includes meetings that the user 116 has or will attend (e.g., calendar entries), commitments of the user 116 (e.g., tasks to be completed by the user 116 that are maintained by the calendar/scheduling application), and so forth. The documents of the user 116 may also include contact information (e.g., names, email addresses, etc.) for contacts of the user 116.

Figure 2A:
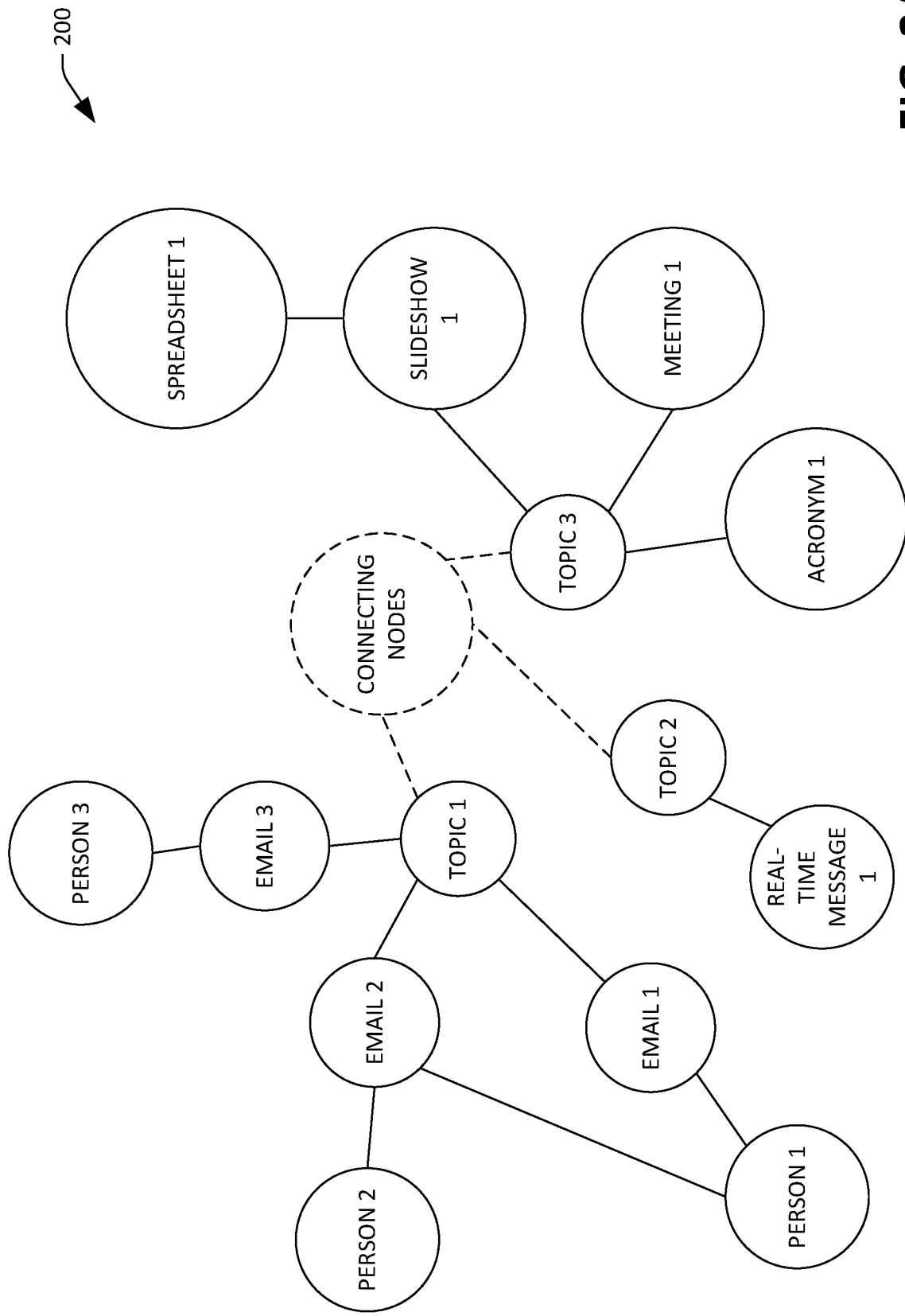
FIGS. 2A-2B are illustrations of an example user graph.

The derived information of the user 116 is derived from the documents. In an example, the derived information of the user 116 includes an acronym and a definition of the acronym found in one of the documents. In another example, the derived information of the user 116 includes a task that the user 116 has agreed to complete in an email or a real-time message with another person. Referring now to FIG. 2A, an example user graph 200 is depicted. The user graph 200 may be or include the user graph 114 or the user graph 114 may be or include the user graph 200. The user graph 200 includes nodes (represented by circles in FIG. 2A) and edges (represented by lines in FIG. 2A) connecting the nodes. Each node is a topic node (e.g., topic node 1, topic node 2, topic node 3) or an entity node. Entity nodes include nodes representing people (e.g., person node 1, person node 2, person node 3), nodes representing documents (e.g., email node 1, email node 2, email node 3, real-time message node 1, slideshow node 1, spreadsheet node 1, meeting node 1), or nodes representing derived information (e.g., acronym node 1). It is contemplated that the user graph 200 may include many nodes (e.g., hundreds, thousands, millions, and so forth). In the example depicted in FIG. 2A, topic node 1, topic node 2, and topic node 3 are connected to one another in the user graph 200 by many connecting nodes and connecting edges (illustrated by dotted circles and dotted lines, respectively).

Referring back to FIG. 1, the computing environment 100 further includes a first user data source 118 and an Nth user data source 120 that store data of the user 116, where N is a positive integer greater than one (collectively referred to herein as "the plurality of user data sources 118-120"). The plurality of user data sources 118-120 store the documents of the user 116, derived information of the user 116, or other data of the user 116. In an example, the first user data source 118 stores a text document authored by the user 116 and the Nth user data source 120 stores an email sent by the user 116 to a contact of the user 116. According to embodiments, the plurality of user data sources 118-120 are or include cloud-based storage, server-based storage, and/or local storage of devices operated by the user 116. According to embodiments, the plurality of user data sources 118-120 include Microsoft® SharePoint® storage or Microsoft® OneDrive® storage. Nodes in the user graph 114 may include metadata. In an example, metadata for a node in the user graph 114 representing a document authored by the user 116 includes an identifier for the document, an identifier for a storage location of the document (e.g., one of the plurality of user data sources 118-120), a time of creation of the document, a manner in which the document was accessed (e.g., whether the document was created by the user 116, edited by the user 116, and/or viewed by the user 116), etc.

According to embodiments, the graph data store 112 further stores a tenancy graph 122 for a tenancy (e.g., a group, a team, or an organization) of the user 116. The tenancy graph 122 is similar to the user graph 114. For instance, the tenancy graph 122 includes nodes and edges connecting the nodes. The nodes in the tenancy graph 122 include topic nodes and entity nodes. However, unlike the user graph 114, the nodes representing documents in the tenancy graph 122 represent documents that are associated with the tenancy and that are accessible to the user 116, but that may or may not have been previously accessed by the user 116. For this reason, the tenancy graph 122 may include nodes (e.g., representing topics, documents, etc.) and edges that are not represented in the user graph 114 and vice versa. Although not depicted in FIG. 1, it is to be understood that the user 116 may belong to more than one tenancy, and hence, the graph data store 112 may store a tenancy graph for each tenancy to which the user 116 belongs (as well as tenancy graphs for tenancies to which the user 116 does not belong).

The computing environment 100 additionally includes a computing device 124 that is operated by the user 116. In an example, the computing device 124 may be a desktop computing device, a laptop computing device, a tablet computing device, a smartphone, etc. The computing device 124 is in communication with the computing system 102 by way of a network 126 (e.g., the Internet, intranet, etc.). According to embodiments, the computing device 124 is in communication with one or more of the plurality of user data sources 118-120. It is to be understood that some or all of the plurality of user data sources 118-120 may be part of the computing device 124.

The computing device 124 includes a processor 128 and memory 130, where the memory 130 has productivity applications 132 loaded therein. In general, the productivity application 132, when executed by the processor 128, are configured to enable the user 116 to create computer-readable content and/or communicate with other people (e.g., users) over the network 126. The productivity applications 132 may be or include a document application, a spreadsheet application, a slideshow application, an email application, and/or a real-time messaging application. Likewise, according to embodiments, the productivity applications 132 include Microsoft® Word, Microsoft® Excel, Microsoft® PowerPoint®, Microsoft® Outlook®, and/or Microsoft Teams®. According to some embodiments, the productivity applications 132 include a web browser.

The productivity applications 132 include a canvas application 134. According to embodiments, the canvas application 134 is an email application (e.g., Microsoft® Outlook®) or a real-time messaging application (e.g., Microsoft Teams®). As will be described in greater detail below, the canvas application 134 is generally configured to visually display a personalized user experience for the user 116 based upon the user graph 114. According to some embodiments, the canvas application 134 is a web browser. According to some embodiments, the canvas application 134 is a web-based collaborative platform (e.g., Microsoft® SharePoint®) that integrates with the productivity applications 132. According to some embodiments, the canvas application 134 is provided by an operating system. According to some embodiments, the canvas application 134 is a document management and storage system.

The computing device 124 includes input components 136 that enable the user 116 to set forth input to the computing device 124. The input components 136 may include a mouse, a keyboard, a trackpad, a scroll wheel, a microphone, a camera, a touchscreen, a video camera, etc. The computing device 124 also includes output components 138 that enable data to be presented to the user 116. The output components 138 include a display 140, where graphical features are presented thereon. The display 140 may be a touchscreen display. The canvas application 134 (or another application) presents a GUI 142 (also referred to herein as "the canvas application GUI 142") on the display 140. The output components 138 may also include a speaker, a haptic feedback device, etc. (not illustrated in FIG. 1).

Example operation of the computing environment 100 is now set forth. If the user 116 opts-in, the graph application 108 obtains (e.g., receives or generates) user activity data of the user 116 from a plurality of applications and generates and maintains the user graph 114 for the user 116 based upon the user activity data. The user activity data may include historical activity data of the user 116 and/or real-time data of the user 116 collected via a plugin or interop communication. In an example, an email application is utilized by the user 116 to draft and send an email to a contact of the user 116. The graph application 108 obtains the email and identifies a topic of the email (e.g., using AI models and algorithms). The graph application 108 generates an entity node representing the email, identifies a topic node in the user graph 114 corresponding to the topic, and connects the entity node to the topic node via an edge, where the edge is assigned criteria indicating that the email belongs to the topic. In the event that a node representing the topic does not currently exist in the user graph 114, the graph application 108 creates the topic node and connects the entity node to the topic node via the edge. It is to be understood that the graph application 108 may identify more than one topic for a document and as such, an entity node representing the document may be connected to more than one topic node. Furthermore, the graph application 108 may connect the entity node to other entity nodes via edges. In an example, the graph application 108 connects the entity node representing the email to a person node representing the contact of the user 116 with an edge and assigns the edge criteria indicating that the email was sent to the contact of the user 116. In some embodiments, the graph application 108 also generates and maintains the tenancy graph 122 for the tenancy of the user 116.

The AI personalization application 110 obtains an identifier for the user 116. In one example, the AI personalization application 110 receives the identifier from the computing device 124. In another example, the AI personalization application 110 has access to identifiers for a plurality of users and accesses the identifier for the user 116 periodically (e.g., once an hour, once a day, etc.). In yet another example, the AI personalization application 110 obtains the identifier for the user 116 when the user graph 114 for the user 116 is updated to reflect new activities performed by the user 116 via computer-executable applications, such as creating a new document.

The AI personalization application 110 retrieves the user graph 114 for the user 116 based upon the identifier for the user 116. With more particularity, the AI personalization application 110 may execute a search over user graphs stored in the graph data store 112 based upon the identifier for the user 116. The search produces search results, where the search results include the user graph 114. According to embodiments, the AI personalization application 110 may provide the identifier for the user 116 to the graph application 108. According to the embodiments, the graph application 108 executes the search and returns the user graph 114 to the AI personalization application 110. The AI personalization application 110 identifies a subset of topic nodes (also referred to herein as a cluster of topic nodes) in the user graph 114, where the subset of topic nodes corresponds to a productivity area of the user 116. In an example, the productivity area is a project worked on by the user 116 along with other users. The AI personalization application 110 may identify different clusters of topic nodes, where each cluster corresponds to a different productivity area of the user 116. In an example, the AI personalization application 110 identifies a first cluster of topic nodes and a second cluster of topic nodes within the user graph 114, where the first cluster corresponds to a first productivity area of the user 116 and the second cluster corresponds to a second productivity area of the user 116.

Figure 2B:
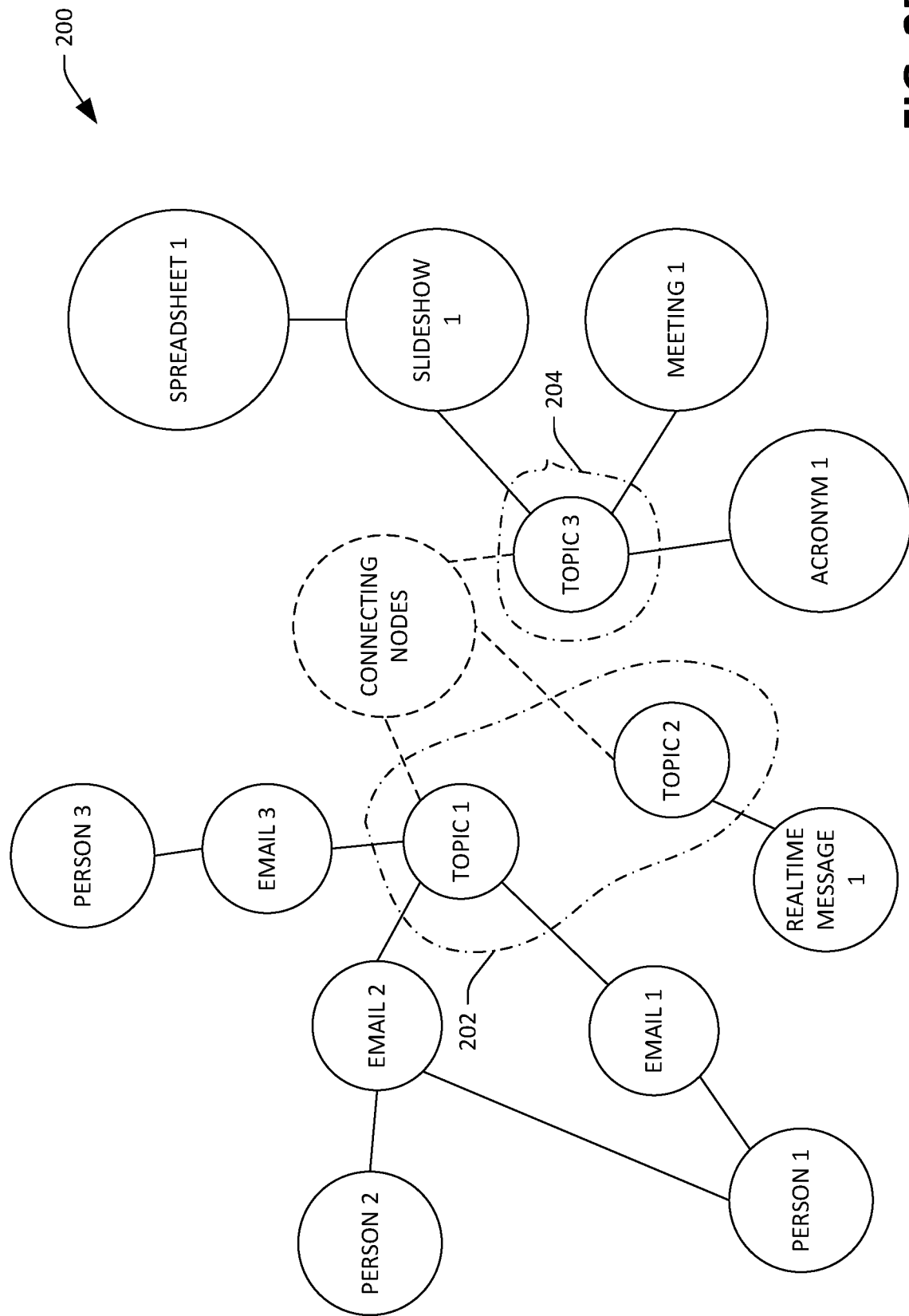

Referring briefly to FIG. 2B, clustering of topic nodes within the user graph 200 is illustrated. As depicted in FIG. 2B, the AI personalization application 110 has identified a first cluster of topic nodes 202 (topic node 1 and topic node 2) corresponding to a first productivity area of the user 116 and a second cluster of topic nodes 204 (topic node 3) corresponding to a second productivity area of the user 116.

Turning back to FIG. 1, according to some embodiments, the AI personalization application 110 identifies clusters of topic nodes using a hierarchical agglomerative clustering algorithm. The AI personalization application 110 may utilize a suitable metric and a suitable linkage criteria to identify the clusters of topic nodes.

According to embodiments, the AI personalization application 110 accesses a list of frequently used topics of the user 116 (generated based upon the user activity data). In an example, the list of frequently used topics is generated based upon emails and/or real-times messages sent to and sent by the user 116 over a window of time from a current time (e.g., within the previous three months). The AI personalization application 110 identifies topic nodes within the user graph 114 corresponding to topics in the list of frequently used topics. The AI personalization application 110 identifies the clusters of nodes using a hierarchical agglomerative clustering algorithm. In this manner, the AI personalization application 110 may identify clusters of topic nodes in a computationally efficient manner that is less subject to noise than clustering the entirety of the topic nodes of the user graph 114.

According to embodiments, the AI personalization application 110 identifies that a first topic node and a second topic node belong to a cluster of topic nodes based upon a number of edges that connect the first topic node to the second topic node within the user graph 114.

Subsequent to identifying the cluster of topic nodes, the AI personalization application 110 takes each topic node within the cluster of topic nodes as a seed node and performs a walk of the user graph 114 based thereon in order to identify people, documents, and/or derived information that are pertinent to the productivity area (referred to herein as "personalized data"). In an example, the AI personalization application 110 locates a topic node (in the cluster of topic nodes) within the user graph 114. The AI personalization application 110 then traverses edges that connect the topic to reach at least one second level node in the user graph 114 ("a first level of expansion"). For each second level node, the AI personalization application 110 may traverse edges connecting the second level node(s) to at least one third level node ("a second level of expansion"). This process may continue until the AI personalization application 110 reaches a threshold level of expansion (e.g., three levels of expansion). The AI personalization application 110 performs walks of each cluster of topic nodes identified above in a similar manner. In an example where the AI personalization application 110 identifies a first cluster of topic nodes corresponding to a first productivity area and a second cluster of topic nodes corresponding to a second productivity area, the AI personalization application 110 performs a first walk of the user graph 114 based upon the first cluster of topic nodes to identify first personalized data for the user 116 and a second walk of the user graph 114 based upon the second cluster of topic nodes to identify second personalized data for the user 116, where the first personalized data corresponds to the first productivity area and the second personalized data corresponds to the second productivity area.

As noted above, nodes within the user graph 114 may include metadata. As the AI personalization application 110 performs the walk of the user graph 114, the AI personalization application 110 utilizes the metadata for each node that is traversed while performing the walk in order to access information pertaining to people, documents, or derived information represented by each node. In an example, the AI personalization application 110 uses metadata found in a document node for a document to access the document (e.g., from one of the plurality of user data sources 118-120). Additionally or alternatively, the AI personalization application 110 may identify a subset of people nodes in the user graph 114 using processes similar to those described above with respect to the topic nodes. Additionally or alternatively, the AI personalization application 110 may utilize the subset of people nodes of the user graph 114 as seed nodes for the walk of the user graph 114. Subsequent to performing the walk of the user graph 114 to identify the personalized data that is pertinent to the productivity area, the AI personalization application 110 may rank the people, the documents, and/or the derived information in the personalized data for the productivity area. The AI personalization application 110 may rank the people, the documents, and/or the derived information based upon suitable factors, such as a number of times a person was contacted by the user 116, a number of times the user 116 contacted the person, positions of the user 116 and the person within an organizational structure, a number of times a document/derived information was accessed, a number of references in the document/derived information to other documents/derived information, a number of references to the document/derived information in other documents/derived information, manually set forth relevance scores, and so forth. The AI personalization application 110 ranks the people, the documents, and/or the derived information in the personalized data for each productivity area in a similar manner.

The AI personalization application 110 may remove certain elements from the personalized data based upon the aforementioned rankings. In an example where the personalized data for a productivity area references ten documents, the AI personalization application 110 may remove documents from the personalized data that have rankings below a threshold value (e.g., below a top five ranking). The AI personalization application 110 may perform similar actions for the people and the derived information as well.

The AI personalization application 110 may also rank the productivity areas themselves for relevance based upon the people, the documents, and/or the derived information for each of the productivity areas. The AI personalization application 110 may remove productivity areas (and their corresponding people, documents, and/or derived information) from the personalized data based upon the rankings of each productivity area. In an example where the AI personalization application 110 identifies ten productivity areas (and hence ten clusters), the AI personalization application 110 may remove (from the personalized data) information pertaining to productivity areas that have rankings below a threshold value (e.g., below a top five ranking).

As noted above, nodes in the user graph 114 may include metadata, where the metadata may include a time of last access for a document represented by an entity node. While performing the walk of the user graph 114, the AI personalization application 110 may examine metadata for a document node representing a document and filter the document from further consideration if a time of last access for the document exceeds a threshold period of time (e.g., three months). As such, the AI personalization application 110 ensures that "stale" documents are not included in the personalized data. The AI personalization application 110 may perform similar actions for the people and the derived information as well.

The AI personalization application 110 transmits the personalized data to the canvas application 134, where the personalized data is for the one or more productivity areas of the user 116. For each productivity area, the personalized data may include an identifier for the productivity area, identifiers for topics (e.g., identifiers for the topic nodes) related to the productivity area, identifiers for acronyms and definitions of the acronyms related to the productivity area, identifiers for commitments of the user 116 (e.g., tasks the user 116 has agreed to complete) with respect to the productivity area, identifiers for people related to the productivity area, identifiers for meetings related to the productivity area, identifiers for messages (e.g., emails and real-time messages) related to the productivity area, and/or identifiers for documents related to the productivity area. Upon receiving the personalized data, the canvas application 134 presents the GUI 142 on the display 140, where contents of the GUI 142 are based upon the personalized data. With more particularity, the GUI 142 may include a plurality of regions (e.g., a plurality of windows), where each region is assigned to a different productivity area identified vis-à-vis the clustering of the nodes of the user graph 114. A region in the GUI 142 assigned to a productivity area includes identifiers for people, identifiers for documents, and/or identifiers for derived information that are obtained based upon the walk of the user graph 114 described above. According to embodiments, the identifiers for the people, the identifiers for the documents, and/or the identifiers for the derived information are presented within the GUI 142 based upon the rankings (described above) of each of the people, the documents, and/or the derived information. Via the different regions of the GUI 142, the user 116 is able to visualize different productivity areas and easily access data associated therewith. In essence, a region assigned to a productivity area may serve as a summary of information of the user 116 that is pertinent to the productivity area.

Turning now to FIG. 3, an example GUI 300 of the canvas application 134 is illustrated. The GUI 300 may be or include the GUI 142 or the GUI 142 may be or include the GUI 300. The GUI 300 includes a first region 302 corresponding to a first productivity area of the user 116 and a second region 304 corresponding to a second productivity area of the user 116, where the first productivity area and the second productivity area are identified by the AI personalization application 110 vis-à-vis clustering of nodes of the user graph 114. Although not depicted in FIG. 3, it is to be understood that the GUI 300 may include additional regions corresponding to additional productivity areas of the user 116 identified vis-à-vis clustering of nodes in the user graph 114 (described above).

The first region 302 corresponding to the first productivity area of the user 116 includes an identifier for the first productivity area 306. The first region 302 further includes tags 308, where each tag 308 is an identifier for a topic (represented by a topic node in the user graph 114) that was used to generate the first productivity area. The first region 302 includes acronyms and definitions 310 corresponding to the first productivity area, where the acronyms and definitions are based upon the derived information identified from the walk of the user graph 114. The first region 302 further includes identifiers for commitments 312 (e.g., tasks to be completed) of the user 116 with respect to the first productivity area. The first region 302 also includes identifiers for people 314 (e.g., contacts of the user 116) that are related to the first productivity area. The first region 302 additionally includes identifiers for meetings 316 that the user 116 has or will attend with respect to the first productivity area. An identifier for a meeting may include a title of the meeting and a date and time of the meeting. The first region 302 also includes identifiers for emails 318 that are related to the first productivity area. The first region 302 further includes identifiers for (non-message related) documents 320 (e.g., text documents, spreadsheets, etc.) related to the first productivity area. Orderings of the identifiers within the first region 302 may be based rankings of their corresponding people/documents/derived information.

The second region 304 corresponding to the second productivity area of the user 116 includes elements similar to those of the first region 302. For instance, the second region 304 includes tags 324 corresponding to the second productivity area, identifiers for commitments 326 of the user 116 corresponding to the second productivity area, identifiers for people 328 related to the second productivity area, identifiers for meetings 330 related to the second productivity area, identifiers for emails 332 related to the second productivity area, and identifiers for documents 334 related to the second productivity area. However, as the second productivity area is different than the first productivity area, certain elements of the second region 304 differ from the first region 302. In the example shown in FIG. 3, the second region 304 does not include acronyms and definitions.

The first region 302 of the GUI 300 may include a first customize button 336. When the GUI 300 receives a selection of the first customize button 336, the canvas application 134 may receive customizations as input from the user 116. Example customizations include changing orderings of the identifiers displayed within the first region 302 of the GUI 300, including more or less identifiers in each category of identifiers displayed within the first region 302 of the GUI 300, removing or adding categories of identifiers displayed within the first region 302 of the GUI 300, font type/font size/font color changes, and so forth. Likewise, the second region 304 may include a second customize button 338 that provides functionality similar to the functionality provided by the first customize button 336; however, any customizations performed via the second customize button 338 are particular to the second region 304 representing the second productivity area (and not the first region 302 representing the first productivity area). In this manner, the user 116 may individually customize different regions within the GUI 300 according to his/her preferences. It is to be understood that the identifiers displayed within the first region 302 and the second region 304 of the GUI 300 are selectable. When the GUI 300 receives a selection of an identifier, the canvas application 134 performs an action with respect to the identifier. In an example, when the GUI 300 receives a selection of "Person 1" displayed in the identifiers for people 314, the canvas application 134 causes an email to be generated and displayed to the user 116, where the email message is auto-addressed to "Person 1", includes an identifier for the first productivity area in a subject line of the email, and has an empty body that can be completed by the user 116. In another example, when the GUI 300 receives a selection of "Document 1" displayed in the identifiers for documents 320, the canvas application 134 causes "Document 1" to be opened in an application corresponding to a type of "Document 1", where the application presents "Document 1" to the user 116.

According to embodiments, the first productivity area and the second productivity are ranked as described above. As such, the first region 302 corresponding to the first productivity area and the second region 304 corresponding to the second productivity area are positioned within the GUI 300 based upon their respective rankings.

The GUI 300 may also include a top-of-mind button 340. When the GUI 300 receives a selection of the top-of-mind button 340, the canvas application 134 removes regions of the GUI 300 corresponding to productivity areas that are not immediately relevant to the user 116. The AI personalization application 110 may determine immediate relevance of a productivity area based upon metadata for nodes traversed while performing the walk of the user graph 114. In an example, the user 116 has a task (e.g., a commitment) within the first productivity area that is to be completed within the next day, while the second productivity area has a meeting that is to occur in three weeks. Based upon such information, the canvas application 134 removes the second region 304 from the GUI 300.

According to embodiments, information presented within the canvas application GUI 142 may be supplemented with information obtained from a walk of the tenancy graph 122, where the walk of the tenancy graph 122 is based upon identifiers for people, identifiers for documents, and/or identifiers for derived information for a productivity area of the user 116 identified via clustering of the user graph 114.

Although the above-described processes have been described as being primarily performed by computing system 102, other possibilities are contemplated. According to embodiments, the AI personalization application 110 executes on the computing device 124 and the user graph 114 is stored in local storage of the computing device 124. According to the embodiments, the computing device 124 may generate the personalized user experience described above.

Figure 4:
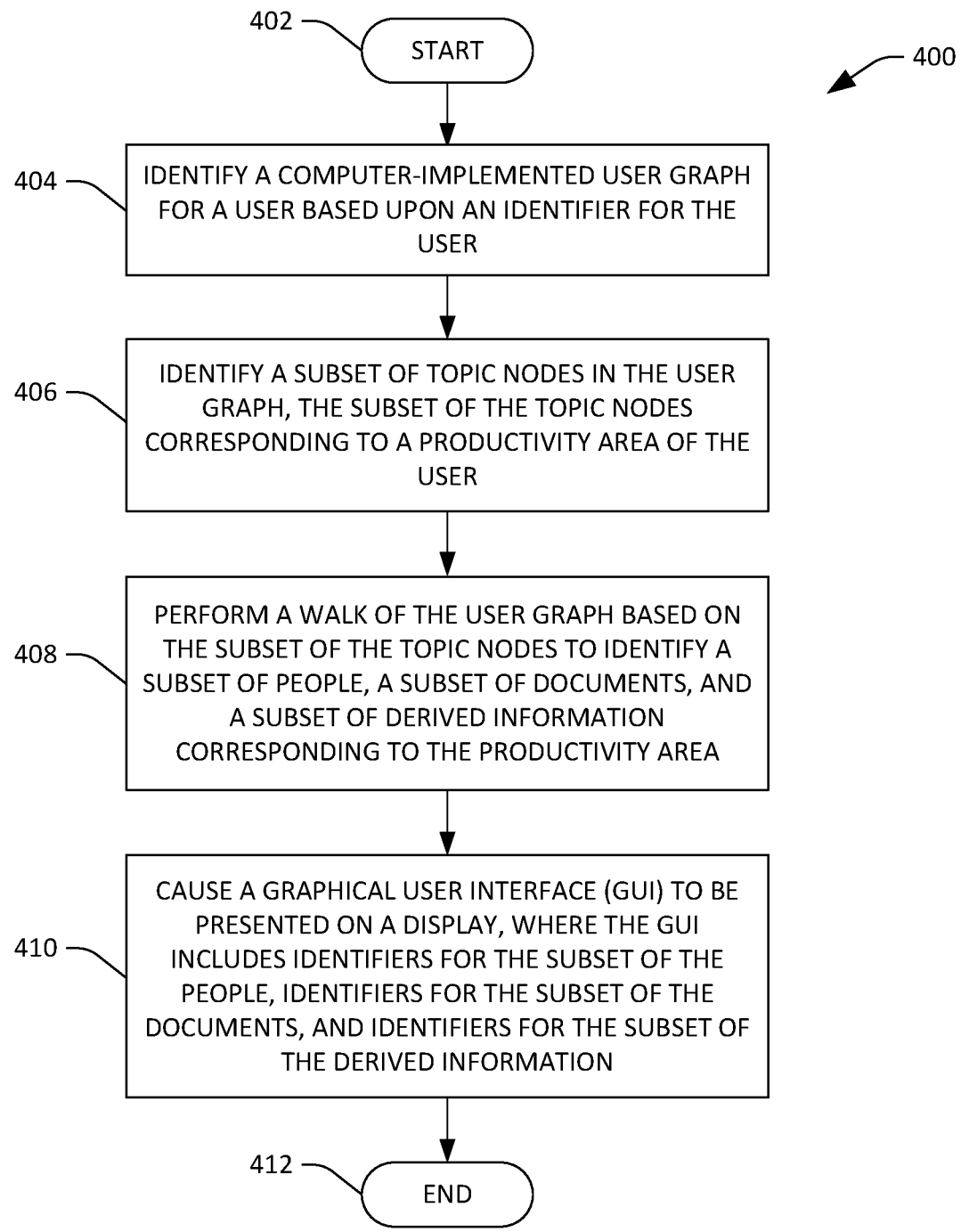
FIG. 4 is a flow diagram that illustrates an example methodology performed by a computing system that provides a personalized user experience via graph intelligence.
Figure 5:
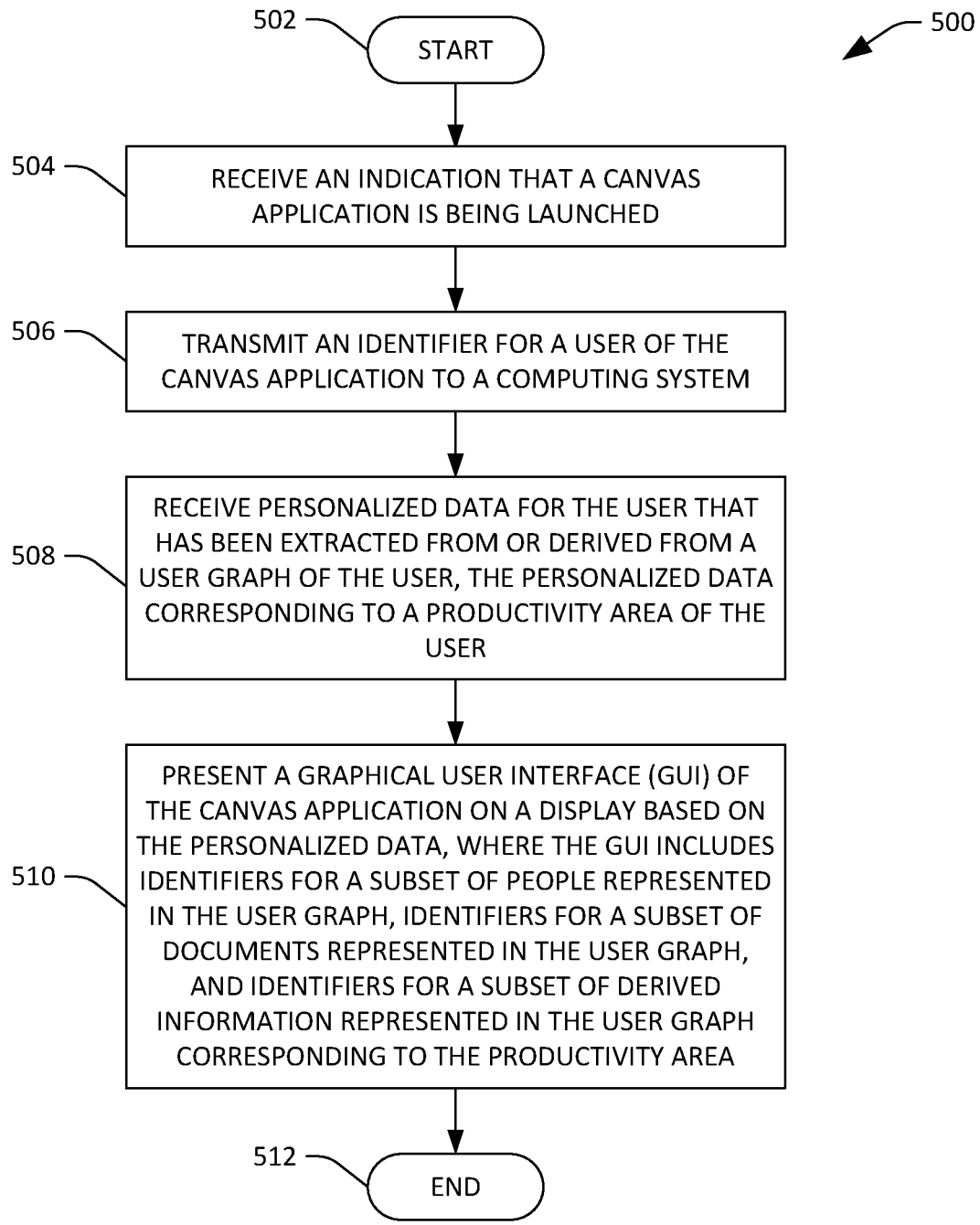
FIG. 5 is a flow diagram that illustrates an example methodology performed by a computing device operated by a user that provides a personalized user experience via graph intelligence.

FIGS. 4 and 5 illustrate example methodologies relating to providing a personalized user experience via graph intelligence. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 4, a methodology 400 performed by a computing system that facilitates providing a personalized user experience via graph intelligence is illustrated. The methodology 400 begins at 402, and at 404, the computing system identifies a computer-implemented user graph for a user from amongst a plurality of computer-implemented user graphs for users based upon an identifier for the user. The user graph includes nodes and edges connecting the nodes. The nodes include topic nodes representing topics and entity nodes. The entity nodes represent people associated with the user, documents of the user, or derived information that is derived from the documents. At 406, the computing system identifies a subset of the topic nodes corresponding to a productivity area of the user. At 408, the computing system performs a walk of the user graph based upon the subset of the topic nodes to identify a subset of the people, a subset of the documents, and a subset of the derived information. Each of the subset of the people, the subset of the documents, and the subset of the derived information correspond to the productivity area. At 410, the computing system causes a GUI to be presented on a display. The GUI includes identifiers for each of the subset of the people, identifiers for each of the subset of the documents, and identifiers for each of the subset of the derived information. The methodology 400 concludes at 412.

Turning now to FIG. 5, a methodology 500 performed by a computing device operated by a user that facilitates providing a personalized user experience via graph intelligence is illustrated. The methodology 500 begins at 502, and at 504, the computing device receives an indication that a canvas application (e.g., an email application, a real-time messaging application, etc.) is being launched. At 506, upon receiving the indication, the computing device transmits an identifier for a user of the canvas application to a computing system. At 508, the computing device receives, from the computing system, personalized data for the user that has been extracted from or derived from a user graph of the user. The user graph includes nodes and edges connecting the nodes. The nodes include topic nodes representing topics and entity nodes. The entity nodes represent people associated with the user, documents of the user, or derived information that is derived from the documents. The personalized data corresponds to a productivity area of the user. At 510, the computing device presents a GUI of the canvas application on a display based upon the personalized data. The GUI includes identifiers for a subset of people represented in the user graph, identifiers for a subset of documents represented in the user graph, and identifiers for a subset of derived information represented in the user graph. Each of the subset of the people, the subset of the documents, and the subset of the derived information correspond to the productivity area. The methodology 500 concludes at 512.

Figure 6:
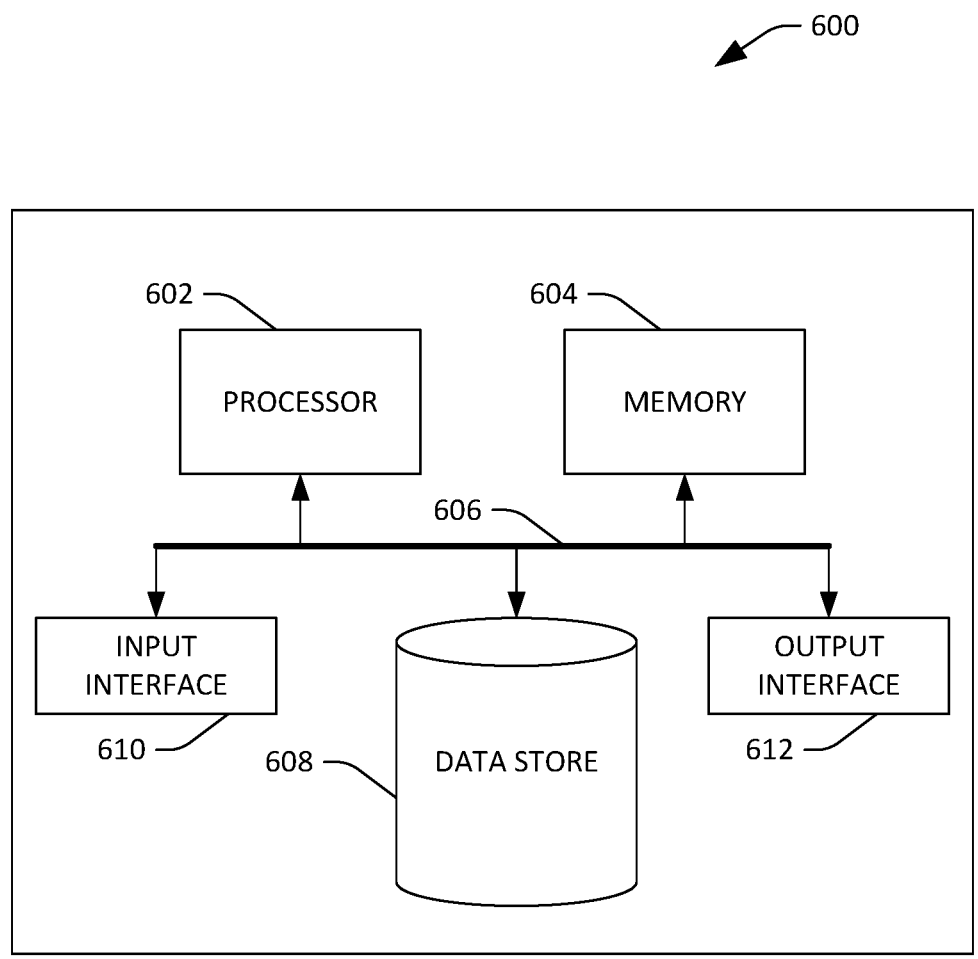
FIG. 6 is an example computing device.

Referring now to FIG. 6, a high-level illustration of an example computing device 600 that can be used in accordance with the systems and methodologies disclosed herein is illustrated. For instance, the computing device 600 may be used in a system that provides a personalized user experience via graph intelligence. By way of another example, the computing device 600 can be used in a system that displays a GUI that provides a personalized user experience via graph intelligence. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store user graphs, tenancy graphs, documents, derived information, etc.

The computing device 600 additionally includes a data store 608 that is accessible by the processor 602 by way of the system bus 606. The data store 608 may include executable instructions, user graphs, tenancy graphs, documents, derived information, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth. Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. Such computer-readable storage media can include random-access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present disclosure relates to providing a personalized user experience via graph intelligence according to at least the examples provided in the section below:

(A1) In one aspect, some embodiments include a method (e.g., 400) executed by a processor (e.g., 104) of a computing system (102). The method includes identifying (e.g., 404) a computer-implemented user graph (e.g., 114, 200) for a user (e.g., 116) from amongst a plurality of computer-implemented user graphs for users based upon an identifier for the user. The user graph includes nodes and edges connecting the nodes. The nodes include topic nodes representing topics and entity nodes. The entity nodes represent people associated with the user, documents of the user, or derived information that is derived from the documents. The method further includes identifying (e.g., 406) a subset (e.g., 202) of the topic nodes corresponding to a productivity area of the user. The method additionally includes performing (e.g., 408) a walk of the user graph based upon the subset of the topic nodes to identify a subset of the people, a subset of the documents, and a subset of the derived information, where each of the subset of the people, the subset of the documents, and the subset of the derived information correspond to the productivity area. The method also includes causing (e.g., 410) a graphical user interface (GUI) (e.g., 142, 300) to be presented on a display (e.g., 140), where the GUI includes identifiers for each of the subset of the people (e.g., 314), identifiers for each of the subset of the documents (e.g., 320), and identifiers for each of the subset of the derived information (e.g., 310).

(A2) In some embodiments of the method of A1, the subset of the topic nodes is identified based upon a hierarchical agglomerative clustering algorithm.

(A3) In some embodiments of any of the methods of A1-A2, the subset of the topic nodes is identified based upon electronic communications between the user and the people that have occurred within a window of time from a current time.

(A4) In some embodiments of any of the methods of A1-A3, an entity node assigned to an entity comprises metadata for the entity.

(A5) In some embodiments of any of the methods of A1-A4, the identifiers for each of the subset of the people, the identifiers for each of the subset of the documents, and the identifiers for each of the subset of the derived information are presented within a first region (e.g., 302) of the GUI. The method further includes identifying a second subset (e.g., 204) of the topic nodes corresponding to a second productivity area of the user. The method additionally includes performing a second walk of the user graph based upon the second subset of the topic nodes to identify a second subset of the people, a second subset of the documents, and a second subset of the derived information, where each of the second subset of the people, the second subset of the documents, and the second subset of the derived information correspond to the second productivity area. The method also includes causing identifiers for the each of the second subset of the people, identifiers for each of the second subset of the documents, and identifiers for each of the second subset of the derived information to be presented within a second region (e.g., 304) of the GUI.

(A6) In some embodiments of the method of A5, the method further includes ranking the first productivity area of the user and the second productivity area of the user, where the first region and the second region are ordered within the GUI based upon the ranking of the first productivity area and the ranking of the second productivity area.

(B1) In another aspect, some embodiments include a computing system (e.g., 102) that includes a processor (e.g., 104) and memory (e.g., 106). The memory stores instructions that, when executed by the processor, cause the processor to perform any of the methods described herein (e.g., any of A1-A6).

(C1) In yet another aspect, a non-transitory computer-readable storage medium includes instructions that, when executed by a processor (e.g., 104) of a computing system (e.g., 102), cause the processor to perform any of the methods described herein (e.g., any of A1-A6).

(D1) In another aspect, some embodiments include a method executed by a computing system (e.g., 102) that includes a processor (e.g., 104) and memory (e.g., 106). The method includes obtaining an identifier for a user (e.g., 116). The method further includes identifying a computer-implemented user graph (e.g., 114, 200) for the user from amongst a plurality of computer-implemented user graphs for users based upon the identifier for the user. The user graph includes nodes and edges connecting the nodes. The nodes include topic nodes representing topics and entity nodes. The entity nodes represent people associated with the user, documents of the user, or derived information that is derived from the documents. The method additionally includes identifying a cluster (e.g., 202) of the topic nodes corresponding to a productivity area of the user. The method also includes performing a walk of the user graph based upon the cluster of the topic nodes to identify a subset of the people, a subset of the documents, and a subset of the derived information, where each of the subset of the people, the subset of the documents, and the subset of the derived information correspond to the productivity area. The method further includes causing a graphical user interface (GUI) (e.g., 142, 300) to be presented on a display (e.g., 140), wherein the GUI comprises identifiers for each of the subset of the people (e.g., 314), identifiers for each of the subset of the documents (e.g., 320), and identifiers for each of the subset of the derived information (e.g., 310).

(D2) In some embodiments of the method of D1, the documents include emails received by the user, emails sent by the user, real-time messages received by the user, and real-time messages sent by the user.

(D3) In some embodiments of any of the methods of D1-D2, the method further includes subsequent to performing the walk of the user graph and prior to causing the GUI to be presented on the display, ranking the subset of the people. The method additionally includes ranking the subset of the documents. The method also includes ranking the subset of the derived information, where the identifiers for each of the subset of the people, the identifiers for each of the subset of the documents, and the identifiers for each of the subset of the derived information are presented within the GUI based upon the ranking the subset of the people, the ranking of the subset of the documents, and the ranking of the subset of the derived information.

(D4) In some embodiments of any of the methods of D1-D3, the identifiers for each of the subset of the people, the identifiers for each of the subset of the documents, and the identifiers for each of the subset of the derived information are presented within a first region (e.g., 302) of the GUI. The method further includes identifying a second cluster (e.g., 204) of the topic nodes corresponding to a second productivity area of the user. The method additionally includes performing a second walk of the user graph based upon the second cluster of the topic nodes to identify a second subset of the people, a second subset of the documents, and a second subset of the derived information, where each of the second subset of the people, the second subset of the documents, and the second subset of the derived information correspond to the second productivity area. The method also includes causing identifiers for the each of the second subset of the people, identifiers for each of the second subset of the documents, and identifiers for each of the second subset of the derived information to be presented within a second region (e.g., 304) of the GUI.

(D5) In some embodiments of any of the methods of D1-D4, an email application, a web-based collaborative platform, or a real-time messaging application present the GUI on the display.

(D6) In some embodiments of any of the methods of D1-D5, the derived information includes at least one of commitments of the user, meetings of the user, acronyms, or definitions of the acronyms.

(D7) In some embodiments of any of the methods of D1-D6, the documents are stored in a plurality of user data sources (e.g., 118-120) of the user that are accessible to the user.

(D8) In some embodiments of any of the methods of D1-D7, the method further includes receiving an indication that the user has selected an identifier for a document from amongst the identifiers for each of the subset of the documents. The method additionally includes upon receiving the indication, causing the document to be presented on the display.

(D9) In some embodiments of any of the methods of D1-D8, the method further includes receiving an indication that the user has selected an identifier for a person from amongst the identifiers for each of the subset of the people. The method also includes upon receiving the indication, causing a message to be generated, where the message is addressed to an electronic account of the person.

(D10) In some embodiments of any of the methods of D1-D9, the documents include text documents of the user, slideshows of the user, or spreadsheets of the user.

(D11) In some embodiments of any of the methods of D1-D10, causing the graphical user interface (GUI) to be presented on the display includes transmitting, via a network (e.g., 126) connection, data to a computing device (e.g., 124) operated by the user, where the computing device presents the GUI on the display based upon the data.

(E1) In another aspect, a computing system (e.g., 102) includes a processor (e.g., 104) and memory (e.g., 106). The memory stores instructions that, when executed by the processor, cause the processor to perform any of the methods described herein (e.g., any of D1-D11).

(F1) In yet another aspect, a non-transitory computer-readable storage medium includes instructions that, when executed by a processor (e.g., 104) of a computing system (e.g., 102), cause the processor to perform any of the methods described herein (e.g., any of D1-D11).

(G1) In another aspect, some embodiments include a method executed by a computing system (e.g., 102) that includes a processor (e.g., 104). The method includes obtaining an identifier for a user (e.g., 116). The method further includes identifying a computer-implemented user graph (e.g., 114, 200) for the user from amongst a plurality of computer-implemented user graphs for users based upon the identifier for the user. The user graph includes nodes and edges connecting the nodes. The nodes include topic nodes representing topics and entity nodes. The entity nodes represent people associated with the user or documents of the user. The method additionally includes identifying a cluster (e.g., 202) of the topic nodes within the user graph, wherein the cluster of the topic nodes corresponds to a productivity area of the user. The method also includes performing a walk of the user graph based upon the cluster of the topic nodes to identify a subset of the people and a subset of the documents, where each of the subset of the people and the subset of the documents correspond to the productivity area. The method further includes causing a graphical user interface (GUI) (e.g., 142, 300) to be presented on a display (e.g., 140), wherein the GUI comprises identifiers (e.g., 314) for each of the subset of the people and identifiers (e.g., 320) for each of the subset of the documents.

(G2) In some embodiments of the method of G1, the GUI is presented on the display by a computing device (e.g., 124) operated by the user upon an email application being launched by the computing device.

(G3) In some embodiments of any of the methods of G1-G2, the identifiers for each of the subset of the people and the identifiers for each of the subset of the documents are organized within the GUI based upon preferences of the user that are received by the computing system.

(H1) In yet another aspect, a computing system (e.g., 102) includes a processor (e.g., 104) and memory (e.g., 106). The memory stores instructions that, when executed by the processor, cause the processor to perform any of the methods described herein (e.g., any of G1-G3).

(I1) In yet another aspect, a non-transitory computer-readable storage medium includes instructions that, when executed by a processor (e.g., 104) of a computing system (e.g., 102), cause the processor to perform any of the methods described herein (e.g., any of G1-G3). As used herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A computing system, comprising:
    a processor; and
    memory storing instructions that, when executed by the processor, cause the processor to perform acts comprising:
        obtaining an identifier for a user;
        identifying a computer-implemented user graph for the user from amongst a plurality of computer-implemented user graphs for users based upon the identifier for the user, wherein the user graph comprises nodes and edges connecting the nodes, wherein the nodes comprise:
            topic nodes representing topics; and
            entity nodes, wherein the entity nodes represent people associated with the user, documents of the user, or derived information that is derived from the documents;
        identifying, based upon user activity data indicative of user interaction with one or more applications over a first period of time, a cluster of the topic nodes corresponding to a productivity area of the user, wherein the productivity area is indicative of activity of the user over a second period of time;
        performing a walk of the user graph based upon the cluster of the topic nodes to identify a subset of the people, a subset of the documents, and a subset of the derived information, wherein each of the subset of the people, the subset of the documents, and the subset of the derived information correspond to the productivity area; and
        causing a graphical user interface (GUI) to be presented on a display, wherein the GUI comprises as least one of an identifier for the productivity area, an identifier for each of the subset of the people, an identifier for each of the subset of the documents, and an identifier for each of the subset of the derived information.

2. The computing system of claim 1, wherein the documents comprise:
 emails received by the user;
 emails sent by the user;
 real-time messages received by the user; and
 real-time messages sent by the user.

3. The computing system of claim 1, the acts further comprising:
 subsequent to performing the walk of the user graph and prior to causing the GUI to be presented on the display, ranking the subset of the people;
 ranking the subset of the documents; and
 ranking the subset of the derived information, wherein the identifiers for each of the subset of the people, the identifiers for each of the subset of the documents, and the identifiers for each of the subset of the derived information are presented within the GUI based upon the ranking the subset of the people, the ranking of the subset of the documents, and the ranking of the subset of the derived information.

4. The computing system of claim 1, wherein the identifiers for each of the subset of the people, the identifiers for each of the subset of the documents, and the identifiers for each of the subset of the derived information are presented within a first region of the GUI, the acts further comprising:
 identifying a second cluster of the topic nodes corresponding to a second productivity area of the user;
 performing a second walk of the user graph based upon the second cluster of the topic nodes to identify a second subset of the people, a second subset of the documents, and a second subset of the derived information, wherein each of the second subset of the people, the second subset of the documents, and the second subset of the derived information correspond to the second productivity area; and
 causing identifiers for the each of the second subset of the people, identifiers for each of the second subset of the documents, and identifiers for each of the second subset of the derived information to be presented within a second region of the GUI.

5. The computing system of claim 1, wherein an email application, a web-based collaborative platform, or a real-time messaging application present the GUI on the display.

6. The computing system of claim 1, wherein the derived information comprises at least one of:
 commitments of the user;
 meetings of the user;
 acronyms; or
 definitions of the acronyms.

7. The computing system of claim 1, wherein the documents are stored in a plurality of user data sources of the user that are accessible to the user.

8. The computing system of claim 1, the acts further comprising:
 receiving an indication that the user has selected an identifier for a document from amongst the identifiers for each of the subset of the documents; and
 upon receiving the indication, causing the document to be presented on the display.

9. The computing system of claim 1, the acts further comprising:
 receiving an indication that the user has selected an identifier for a person from amongst the identifiers for each of the subset of the people; and
 upon receiving the indication, causing a message to be generated, wherein the message is addressed to an electronic account of the person.

10. The computing system of claim 1, wherein the documents comprise:
 text documents of the user;
 slideshows of the user; or
 spreadsheets of the user.

11. The computing system of claim 1, wherein causing the graphical user interface (GUI) to be presented on the display comprises transmitting, via a network connection, data to a computing device operated by the user, wherein the computing device presents the GUI on the display based upon the data.

12. A method executed by a processor of a computing system, the method comprising:
 identifying a computer-implemented user graph for a user from amongst a plurality of computer-implemented user graphs for users based upon an identifier for the user, wherein the user graph comprises nodes and edges connecting the nodes, wherein the nodes comprise:
  topic nodes representing topics; and
  entity nodes, wherein the entity nodes represent people associated with the user, documents of the user, or derived information that is derived from the documents;
 identifying, based upon user activity data indicative of user interaction with one or more applications over a first period of time, a subset of the topic nodes corresponding to a productivity area of the user, wherein the productivity area is indicative of activity of the user over a second period of time;
 performing a walk of the user graph based upon the subset of the topic nodes to identify a subset of the people, a subset of the documents, and a subset of the derived information, wherein each of the subset of the people, the subset of the documents, and the subset of the derived information correspond to the productivity area; and
 causing a graphical user interface (GUI) to be presented on a display, wherein the GUI comprises at least one of an identifier for the productivity area, an identifier for each of the subset of the people, an identifier for each of the subset of the documents, and an identifier for each of the subset of the derived information.

13. The method of claim 12, wherein the subset of the topic nodes is identified based upon a hierarchical agglomerative clustering algorithm.

14. The method of claim 12, wherein the subset of the topic nodes is identified based upon electronic communications between the user and the people that have occurred within a window of time from a current time.

15. The method of claim 12, wherein an entity node assigned to an entity comprises metadata for the entity.

16. The method of claim 12, wherein the identifiers for each of the subset of the people, the identifiers for each of the subset of the documents, and the identifiers for each of the subset of the derived information are presented within a first region of the GUI, the method further comprising:
 identifying a second subset of the topic nodes corresponding to a second productivity area of the user;
 performing a second walk of the user graph based upon the second subset of the topic nodes to identify a second subset of the people, a second subset of the documents, and a second subset of the derived information, wherein each of the second subset of the people, the second subset of the documents, and the second subset of the derived information correspond to the second productivity area; and causing identifiers for the each of the second subset of the people, identifiers for each of the second subset of the documents, and identifiers for each of the second subset of the derived information to be presented within a second region of the GUI.

17. The method of claim 16, further comprising:
ranking the first productivity area of the user and the second productivity area of the user, wherein the first region and the second region are ordered within the GUI based upon the ranking of the first productivity area and the ranking of the second productivity area.

18. A non-transitory computer-readable storage medium comprising instructions that, when executed by a processor of a computing system, cause the processor to perform acts comprising:
obtaining an identifier for a user;
identifying a computer-implemented user graph for the user from amongst a plurality of computer-implemented user graphs for users based upon the identifier for the user, wherein the user graph comprises nodes and edges connecting the nodes, wherein the nodes comprise:
topic nodes representing topics; and
entity nodes, wherein the entity nodes represent people associated with the user or documents of the user;

identifying, based upon user activity data indicative of user interaction with one or more applications over a first period of time, a cluster of the topic nodes within the user graph, wherein the cluster of the topic nodes corresponds to a productivity area of the user, wherein the productivity area is indicative of activity of the user over a second period of time;
performing a walk of the user graph based upon the cluster of the topic nodes to identify a subset of the people and a subset of the documents, wherein each of the subset of the people and the subset of the documents correspond to the productivity area; and
causing a graphical user interface (GUI) to be presented on a display, wherein the GUI comprises at least one of an identifier for the productivity area, an identifier for each of the subset of the people and an identifier for each of the subset of the documents.

19. The non-transitory computer-readable storage medium of claim 18, wherein the GUI is presented on the display by a computing device operated by the user upon an email application being launched by the computing device.

20. The non-transitory computer-readable storage medium of claim 18, wherein the identifiers for each of the subset of the people and the identifiers for each of the subset of the documents are organized within the GUI based upon preferences of the user that are received by the computing system.

* * * * *